United States Patent
Cousy

(10) Patent No.: US 8,099,610 B2
(45) Date of Patent: Jan. 17, 2012

(54) REMOVABLE DEVICE FOR INJECTING ELECTRIC POWER FOR AN ETHERNET NETWORK

(75) Inventor: Jean-Pierre Cousy, Chevrieres (FR)

(73) Assignees: Legrand France, Limoges (FR); Legrand SNC, Limoges (FR)

( * ) Notice: Subject to any disclaimer, the term of this patent is extended or adjusted under 35 U.S.C. 154(b) by 173 days.

(21) Appl. No.: 12/223,060

(22) PCT Filed: Jan. 25, 2007

(86) PCT No.: PCT/FR2007/000144
§ 371 (c)(1),
(2), (4) Date: Apr. 22, 2010

(87) PCT Pub. No.: WO2007/085734
PCT Pub. Date: Aug. 2, 2007

(65) Prior Publication Data
US 2010/0218004 A1    Aug. 26, 2010

(30) Foreign Application Priority Data
Jan. 27, 2006  (FR) ..................................... 06 00780

(51) Int. Cl.
| G05D 11/00 | (2006.01) |
| H01R 13/60 | (2006.01) |
| H01R 25/00 | (2006.01) |
| H04B 1/38 | (2006.01) |
| H04W 24/00 | (2009.01) |
| G09G 1/08 | (2006.01) |
| H02H 3/20 | (2006.01) |

(52) U.S. Cl. ........ 713/300; 700/286; 439/535; 439/638; 361/90; 455/566; 455/456; 345/13

(58) Field of Classification Search ................... 700/286; 439/535, 638; 713/300; 361/90; 455/566, 455/456; 345/13
See application file for complete search history.

(56) References Cited

U.S. PATENT DOCUMENTS

| 6,123,577 | A * | 9/2000 | Contois et al. ................ 439/535 |
| 6,643,566 | B1 | 11/2003 | Lehr et al. |
| 6,710,704 | B2 * | 3/2004 | Fisher et al. ................... 375/258 |
| 6,916,206 | B2 * | 7/2005 | Ferentz .................... 439/620.01 |
| 7,356,588 | B2 * | 4/2008 | Stineman et al. ............. 709/224 |
| 7,455,527 | B2 * | 11/2008 | Nordin et al. ................... 439/49 |
| 7,472,290 | B2 * | 12/2008 | Diab et al. ..................... 713/300 |
| 2004/0025066 | A1 * | 2/2004 | Jackson et al. ................ 713/300 |
| 2004/0049321 | A1 * | 3/2004 | Lehr et al. ..................... 700/286 |
| 2004/0073597 | A1 | 4/2004 | Caveney |
| 2005/0122701 | A1 | 6/2005 | Coffey |
| 2007/0047525 | A1 * | 3/2007 | He ................................ 370/352 |

OTHER PUBLICATIONS

Linksys Corp., "12 Volt Power Over Ethernet Adapter Kit—User Guide", Jan. 1, 2004, XP002404143.
FRESHNEWS.COM dated Feb. 2005, XP-002404203 dated Oct. 23, 2006, "Irvine—Linksys Introduces New Power Over Ethernet Adapter Kit for Small Business Solutions".

* cited by examiner

*Primary Examiner* — Thomas Lee
*Assistant Examiner* — Aurel Prifti
(74) *Attorney, Agent, or Firm* — Miles & Stockbridge, P.C.

(57) ABSTRACT

A device for injecting electric power for an Ethernet network comprising at least one switch, one switching board, communication ports, and Ethernet cables, the device including a power supply, a power injecting circuit, a control circuit, and a module including a body bearing at least one Ethernet connector capable of being removably inserted in one of the network communication ports.

10 Claims, 4 Drawing Sheets

REMOVABLE DEVICE FOR INJECTING ELECTRIC POWER FOR AN ETHERNET NETWORK

The invention relates in general to hardware equipment used in computer networks associated with standard 802.3af, known to a person skilled in the art as "PoE" or "Power Over Ethernet".

More specifically, the invention relates to an electrical power injection device suitable for an Ethernet network including at least one switch equipped with communication ports, a switching panel equipped with communication ports, a set of terminal communication ports, and Ethernet cables including at least wires for data and connecting at least some of the ports of the switch, ports of the switching panel and terminal ports, which device includes an electrical power supply, at least one power injection circuit connected to the electrical power supply and injecting electrical power over the power lines of at least some of said cables, and at least one management circuit controlling the injection circuit.

The power injectors for computer networks associated with standard 802.3af make it possible to remotely power all computer equipment, such as, for example, IP telephones or IP cameras, which are powered with 48 V, which require a power below 15 W, and which comply with this standard.

The power injection technique is described in particular in the U.S. Pat. No. 6,643,566.

FIG. 1 diagrammatically shows an Ethernet network implementing a classic power injection solution.

Such a network includes a switch 1 equipped with communication ports 11 (called "RJ45"), a power injector 2 called "MidSpan" or an intermediate panel, also equipped with communication ports 21 (RJ45 ports), a switching panel 3 also equipped with communication ports 31 (RJ45 ports), a set of terminal communication ports 41 (RJ45 ports), and Ethernet cables 5 connecting at least some of the communication ports, which cables typically include four pairs of braid conductors denoted 1-2, 3-6, 4-5 and 7-8, and forming lines on which data D (pairs 1-2 and 3-6) or power P (pairs 4-5 and 7-8) circulate.

The switch 1 is connected, for example by optical fibers (not shown) connected behind said switch, to computer resources, such as one or more servers, intended to be shared between a plurality of users.

The injector 2 comprises, on its rear face, a power injection circuit (not visible) connected to one or more power electrical power supply sources (not shown), as well as a management circuit (not visible) suitable for controlling the injection circuit according to the power supply needs of the equipment connected to the injector 2.

The terminal ports 41 are typically distributed in various sites or offices and make it possible to connect the local computer equipment of the various users of shared resources that are connected to the switch 1.

In the example shown, the cables 5 connecting the switch 1 to the injector 2 convey only data D.

However, at least some of the cables 5 connecting the injector 2 to the switching panel 3 include not only wires dedicated to the circulation of data D, but also wires dedicated to supplying electrical power P.

Similarly, at least some of the stationary cables 5 that connect the switching panel 3 to the terminal ports 41 include power distribution wires P making it possible to ensure the functioning of the non-energy-independent local equipment connected to these terminal ports.

As shown in FIG. 1, the switching box of such a network must therefore provide a location for the switch 1, a location for the injector 2 and a location for the switching panel.

The known solutions for reducing the bulk of this equipment lead either to the need to acquire new and expensive switches integrating the PoE function, or the need to introduce exceptions to the Ethernet standard, thus raising problems of incompatibility.

In this context, the invention is intended to propose an electrical power injection device that can be used in an existing Ethernet network, suitable for solving the problem of bulk shown in FIG. 1, and fully compatible with the Ethernet standard.

To this end, the device of the invention, which is otherwise is consistent with the general definition provided in the preamble above, is essentially characterized in that it includes a module with a body having at least one Ethernet connector suitable for being removably inserted into one of the switching ports of the network.

According to the invention, the PoE injection function is therefore integrated in a device capable of being connected to any one of the existing RJ45 ports of the network, and in particular to a communication port of the switching panel 3.

Not only is no change in the configuration of the switching box necessary with respect to an existing configuration free of PoE injection, but the standard wiring verification and testing procedures also remain identically applicable aside from the preliminary disconnection of the injection device.

The invention therefore makes it possible to add the PoE function at any time to an Ethernet network, even preexisting, with a minimum investment and without having to modify the wiring.

The injection circuit is preferably integrated in the module.

The body of the module can advantageously also include at least one communication port suitable for receiving an Ethernet connector connected to the switch or to a terminal Ethernet device.

The electrical power supply includes, for example, an electrical transformer suitable for being connected to the sector, which transformer can be held by the module body or be connected to said module by an electrical cord, preferably capable of being disconnected.

The management circuit can be integrated in the electrical transformer or held by the module body.

The device of the invention can comprise an alignment of a plurality of adjacent Ethernet connectors suitable for being removably inserted in parallel, in a corresponding assembly of communication ports of the network.

In this case, the device may comprise only a single transformer.

Other features and advantages of the invention will become clearer from the following description, provided for indicative and non-limiting purposes, in reference to the appended drawings, in which.

Figure 1:
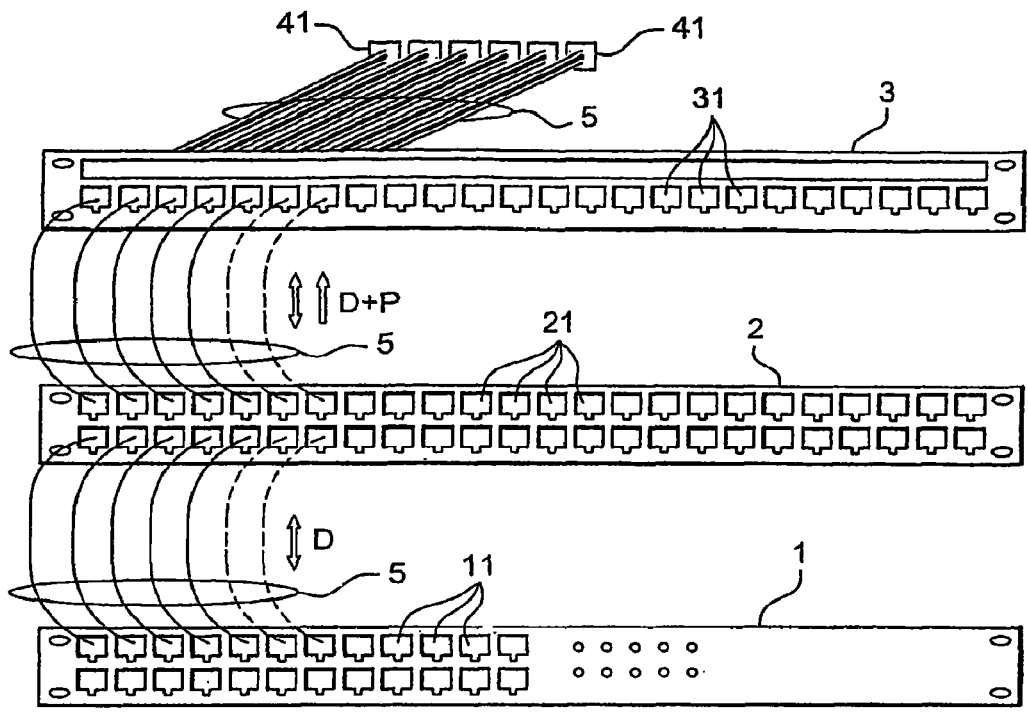
FIG. 1 is a diagram showing an existing Ethernet network.

As mentioned above, the invention relates to an electrical power injection device suitable for an Ethernet network.

Typically, such a network includes, in particular, a switch 1 equipped with communication ports 11, a switching panel 3 equipped with communication ports 31, a set of terminal communication ports 41, and Ethernet cables 5.

These cables 5 include wires for data and serving to connect various communication ports of the network to one another, in particular ports 11 of the switch 1, ports 31 of the switching panel 3 and terminal ports 41.

Figure 2:
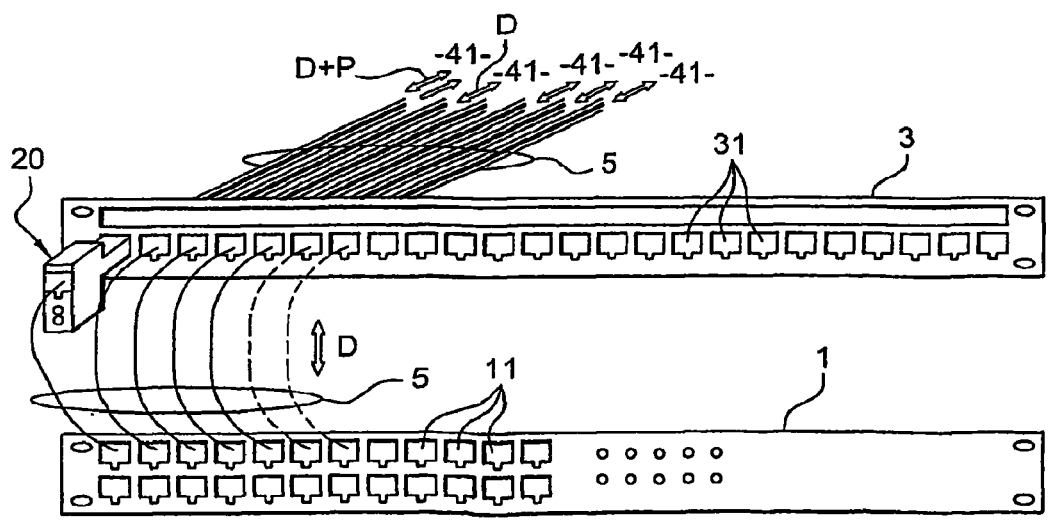
FIG. 2 is a diagram showing an Ethernet network implementing a device according to the invention and functionally comparable to the network of FIG. 1.

The device of the invention includes a module 20 of which the body 24 has one or more Ethernet connectors such as 25, each of which connectors is suitable for being removably inserted into a communication port of the network, such as 31 (FIGS. 2 and 3) or 41 (FIG. 9).

This device also includes an electrical power supply 22, at least one power injection circuit 23, and at least one PoE management circuit 26.

The electrical power supply 22 typically includes an electrical transformer 220 suitable for being connected to the sector.

In the embodiments shown, the transformer 220 is connected to the module 20 by an electrical cord 221, preferably capable of being disconnected from the module.

Nevertheless, it is also possible for the transformer 220 to be integrated in the module 20.

The power injection circuit 23 is connected to the electrical power supply 22 and designed to inject electrical power over power lines of at least some of the cables 5.

This injection circuit 23 can advantageously be held by the body 24 of the module 20.

The PoE management circuit 26 is intended to determine the characteristics and the requirements in terms of the electrical power supply of the Ethernet terminal equipment to which the device of the invention is connected, and thus to control the power injection circuit 23.

Figure 3:
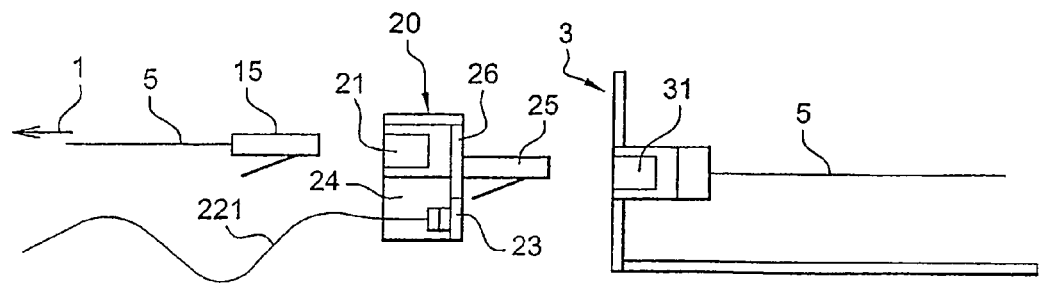
FIG. 3 is a diagram of a connection of a portion of the Ethernet network implementing a device according to the invention.
Figure 4:
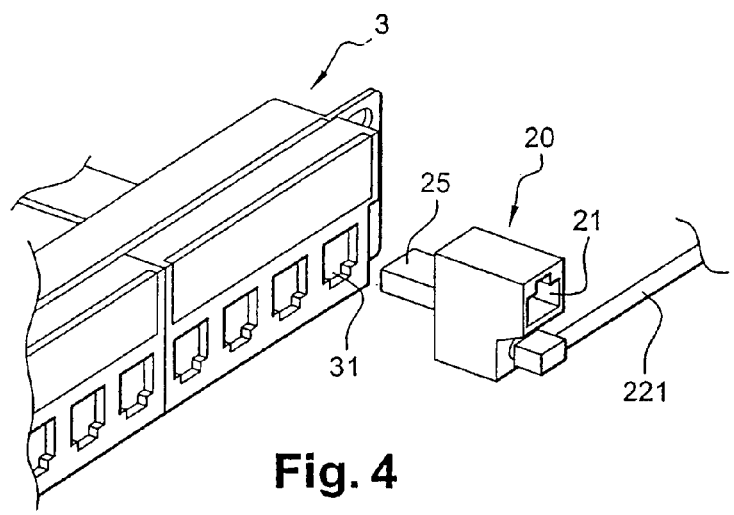
FIG. 4 is a close-up perspective view of a portion of an Ethernet network implementing a device according to a first possible embodiment of the invention.
Figure 5:
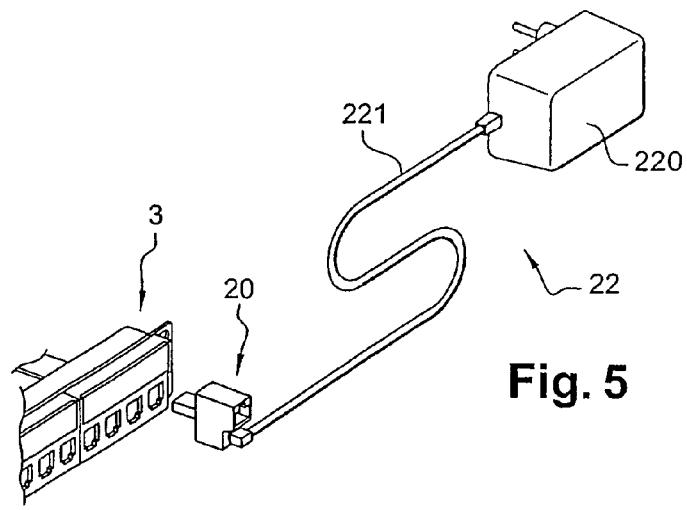
FIG. 5 is a perspective view of a portion of an Ethernet network implementing a device according to the first embodiment of the invention.

This management circuit 26 can be integrated in the electrical transformer 220, or it can be held by the body 24 of the module 20, as shown in FIG. 3.

Figure 8:
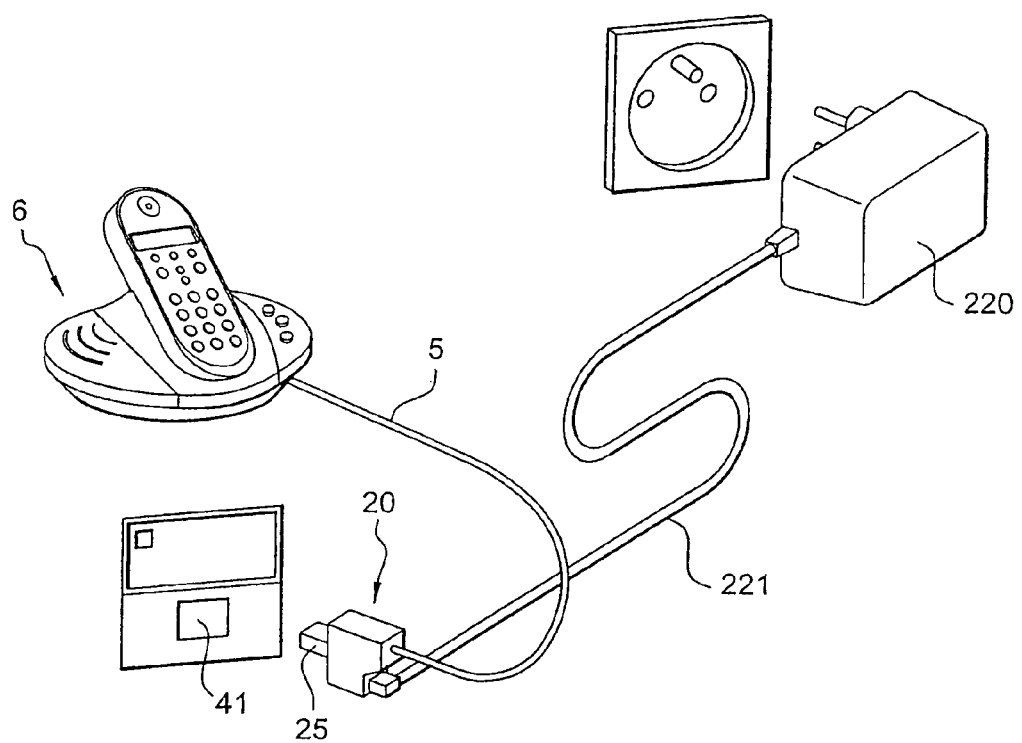
FIG. 8 is a perspective view of a portion of an Ethernet network implementing, at the level of a terminal port, a device according to the first possible embodiment of the invention.

Also as shown in FIG. 3, the device of the invention can also include a communication port 21 suitable for receiving an Ethernet connector 15 connected to the switch 1 (FIG. 2) or to a terminal Ethernet device 6 (FIG. 8).

Figure 6:
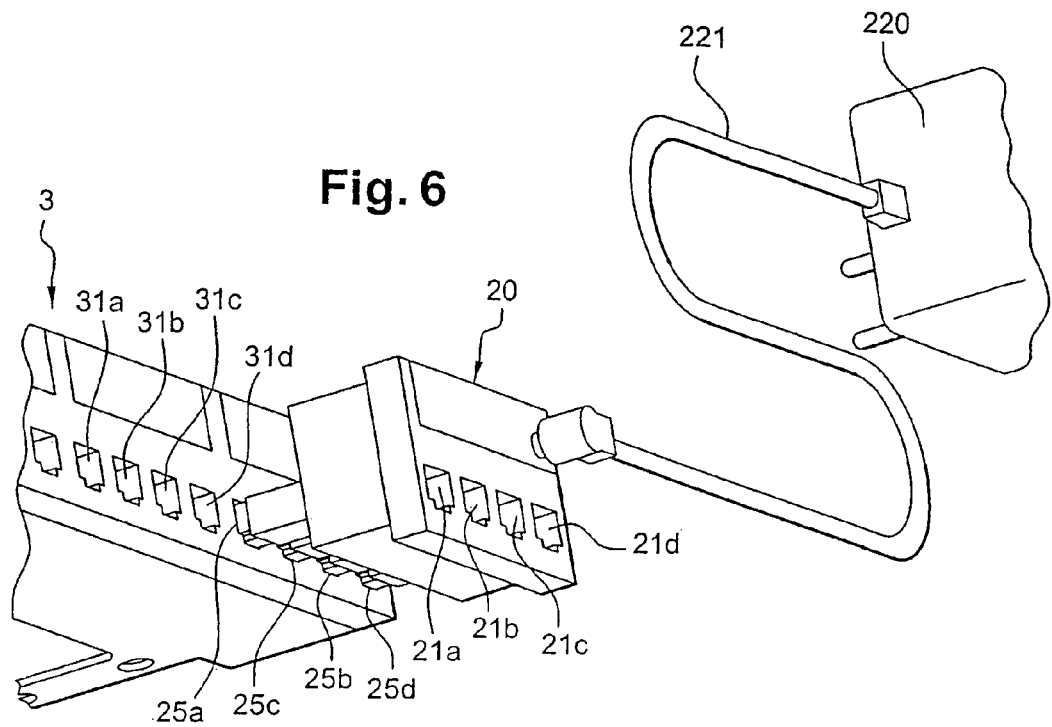
FIG. 6 is a close-up perspective view of a portion of an Ethernet network implementing a device according to a second possible embodiment of the invention.
Figure 7:
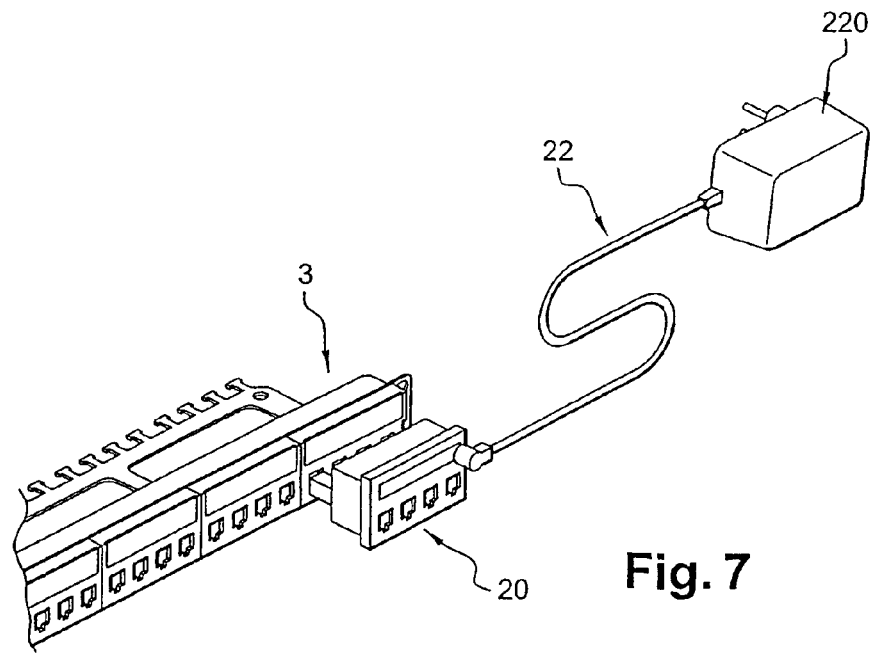
FIG. 7 is a perspective view of a portion of an Ethernet network implementing a device according to the second embodiment of the invention.

If this device includes a plurality of Ethernet connectors such as 25a to 25d (FIG. 6), these connectors form an alignment of Ethernet connectors adjacent to one another and are suitable for being removably inserted in parallel, in a corresponding assembly of communication ports of the network, such as 31a to 31d.

In this case, the device of the invention advantageously includes as many communication ports 21, injection circuits 23 and management circuits 26 as Ethernet connectors 25a to 25d, in which each injection circuit and each management circuit is associated with a port and with a connector.

However, even when the device of the invention includes a plurality of connectors, it preferably comprises a single transformer 220 connected to all of the injection circuits 23 of said device.

The invention claimed is:

1. An electrical power injection device for an Ethernet network that includes at least one switch equipped with a plurality of communication ports, a switching panel equipped with a plurality of communication ports, a set of terminal communication ports, and Ethernet cables including at least wires for data and connecting one or more of said communication ports of the switch, said communication ports of the switching panel and said terminal communication ports, the device comprising:
   an electrical power supply,
   at least one power injection circuit connected to the electrical power supply and configured to inject electrical power over power lines of at least some of said cables, and
   at least one management circuit for controlling the injection circuit, the at least one management circuit including a module having a body with at least one Ethernet connector adapted for being removably inserted into one of the communication ports of the switching panel or one of the terminal communication ports of the network.

2. The device according to claim 1, wherein the injection circuit is integrated in the module.

3. The device according to claim 2, wherein the body includes at least one communication port adapted for receiving an Ethernet connector connected to the switch or to a terminal Ethernet device.

4. The device according to claim 2, wherein the electrical power supply includes an electrical transformer adapted for being connected to a main electrical power supply.

5. The device according to claim 4, wherein the electrical transformer is held by the body of the module.

6. The device according to claim 4, wherein the electrical transformer is connected to the module by an electrical cord which is capable of being disconnected.

7. The device according to claim 6, wherein the management circuit is integrated in the electrical transformer.

8. The device according to claim 1, wherein the management circuit is held by the body of the module.

9. The device according to claim 1, further comprising a plurality of adjacent Ethernet connectors disposed in alignment for being removably inserted in parallel, into a corresponding assembly of said communication ports of said switching panel.

10. The device according to claim 9, further comprising a single transformer.

* * * * *